Nov. 15, 1938.   H. N. DURHAM   2,136,542
POWER ACTUATED CLUTCH MECHANISM FOR AUTOMOTIVE VEHICLES
Filed Nov. 1, 1935
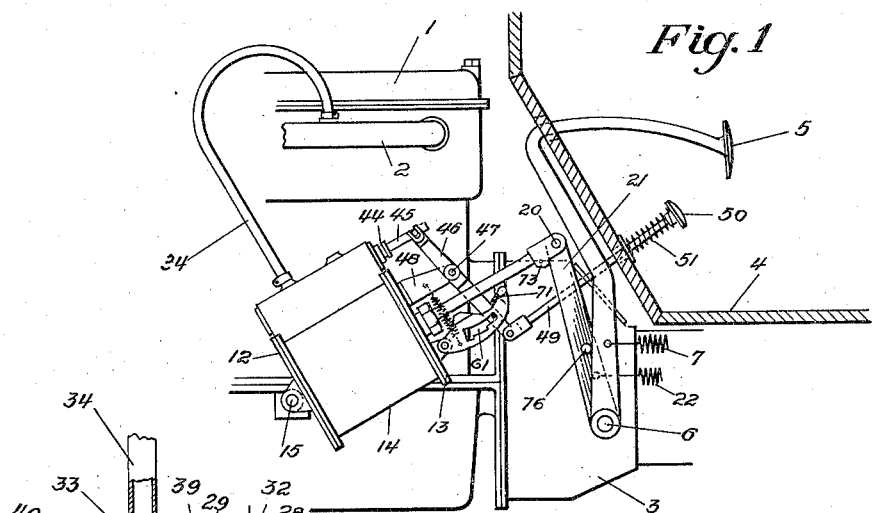
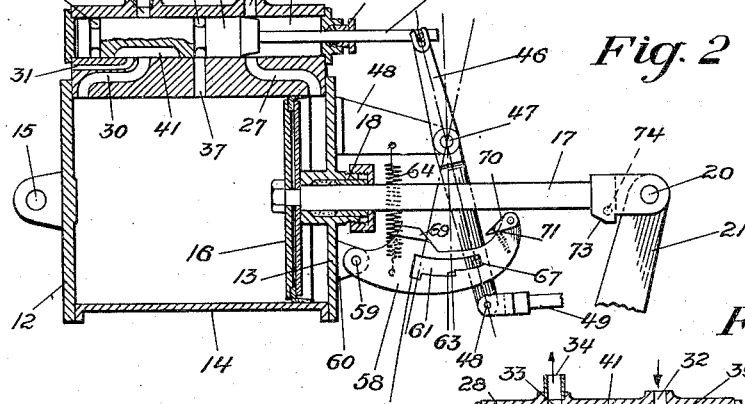
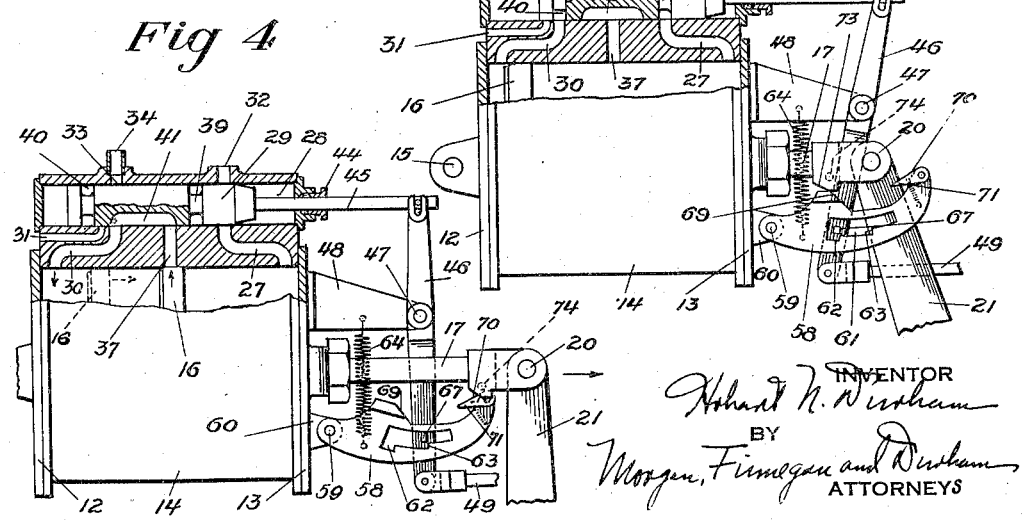
INVENTOR
Hobart N. Durham
BY
Morgan, Finnegan and Durham
ATTORNEYS Patented Nov. 15, 1938

2,136,542

UNITED STATES PATENT OFFICE 2,136,542

POWER ACTUATED CLUTCH MECHANISM FOR AUTOMOTIVE VEHICLES

Hobart N. Durham, Munsey Park, N. Y., assignor to Vaco Products, Inc., a corporation of Delaware Application November 1, 1935, Serial No. 47,736

9 Claims. (Cl. 192—91)

The invention relates to new and useful improvements in power operated clutch control mechanisms for automotive vehicles and more particularly to such clutch control mechanisms operating by differences in fluid pressure created by the motor to engage and disengage the clutch.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:—

Fig. 1 is an elevation of a mechanism embodying the invention;

Fig. 2 is a central longitudinal section through the fluid pressure cylinder and its valve mechanism, showing the mechanism in the position when the clutch is engaged;

Fig. 3 is a similar view to Fig. 2 showing the mechanism in the position when the clutch is disengaged; and Fig. 4 is a similar view showing the mechanism in an intermediate position during the engaging movement of the clutch.

An object of the invention is to provide a simple, sturdy, reliable and positively operating power actuator for throwing out and letting in the clutch mechanism of automotive vehicles, and which governs the engaging movement and action of the clutch so that the operation will be rapid and at the same time gradual, to avoid grabbing and uneven starting. A further object is to provide a piston-equipped actuator operating by positive and regulated air pressures applied on both sides of the piston, the piston being positively connected to the clutch mechanism, these operating to give the desired accurate, rapid and smooth operation. These and other objects are realized through providing fluid pressure actuation and definite and pre-determined control thereof during both the disengaging and re-engaging movements of the clutch, and during particular stages of the re-engaging movement by employing successively varying and controlled pressures on either side of the piston and having a definite relation to the clutch position. The invention provides, in realizing the foregoing and other objects, mechanism having the characteristics described and capacitated to successively connect both sides of the piston with the atmosphere, one side of the piston with the atmosphere and the other side with the motor intake suction, inter-connecting or communicating both sides of the piston when cut off from both the atmosphere and intake, effecting these successive changes in timed relation with definite positions of the piston and clutch mechanism. The invention provides further a power actuator for the clutch which realizes the foregoing advantages and others as well in a very simple mechanism wherein the fluid pressure actuation and control are provided and effected by a very simple mechanism consisting essentially of a closed cylinder with ports at both ends, a valve chest and positively operated slide valve communicating therewith. An additional object of the invention is to provide a power clutch actuator, preferably embodying the foregoing characteristics, which operates under the direct control of the driver and independently of the engine throttle or accelerator.

The foregoing objects and features of the invention will be later exemplified in connection with the present preferred embodiment thereof, together with other objects and features; and it will be understood that the foregoing general description and the following detailed description as well are illustrative and exemplary of the invention but are not restrictive thereof.

Referring now in detail to the accompanying drawing, illustrating by way of example one embodiment of the invention, it is shown in Fig. 1 applied to an automotive vehicle, the internal combustion motor being indicated by 1, with an intake manifold 2, the clutch housing by 3, and the vehicle floor by 4. The clutch may be of any known or suitable form, such as a spring-engaging disc clutch, and the usual foot pedal for disengaging the clutch against its spring is indicated by 5, the pedal lever being fixed on the usual clutch shaft 6, and may be acted on by a spring 7.

In accordance with certain features of the invention, the clutch is disengaged by power and then is power controlled during re-engagement to secure a smooth and proper re-engaging action. In the embodied form of means therefor, a cylinder 14 is pivotally mounted at 15, the cylinder being closed at both ends by heads 12 and 13. Within the cylinder 14 is a piston 16 fixed on a piston rod 17, which reciprocates in a suitable packing gland 18 in the head 13 of the cylinder. The outer end of the piston rod 17 is pivotally connected at 20 to a lever arm 21 which is fixed to the clutch shaft 6, and is impelled in clockwise direction by a spring 22.

In accordance with the foregoing and also other features of the invention, and as embodied, ports and valve mechanism are provided whereby both sides of the piston may communicate with the atmosphere, one side with the atmosphere and the other with the engine intake, and both sides of the piston may intercommunicate, these occurring successively at proper stages in the cycle thereby to impart the proper movement and control to the clutch from the piston. As embodied, a port 27 connects the inner or right-hand end of cylinder 14 with the chamber 28 of the slide valve 29. A port 30 connects the opposite end of the cylinder with the slide valve chamber 28, and a port 31 connects the slide valve chamber with the atmosphere, said port being adjacent to the port 30. A port 32 connects the slide valve chamber 28 with the atmosphere, and a port 33 in the slide valve chamber communicates through a conduit 34 with the motor intake manifold 2. A port 37 connects the central parts of the cylinder 16 and valve chamber 28. The slide valve 29 is shaped and is successively moved and stopped at various positions in its travel so that it will open both ends of the cylinder to atmospheric pressure, will close one end to atmospheric pressure and open the other to the intake suction to produce sub-atmospheric pressure in that end of the cylinder, will connect both sides of the piston to cause a flowage around the piston, operating to equalize the pressure on both sides thereof, and will then again initiate the cycle. The slide valve as embodied is cylindrical in form and has two cut-out annular portions 39 and 40, and a D-shaped cavity 41 such as is found in the ordinary D slide valve.

The actuating means for the valve mechanism, in accordance with certain features of the invention is driver operated to disengage the clutch and is automatically controlled to let in the clutch but at the will of the driver. The embodied form of driver control is independent of the engine throttle or accelerator and the operation of the throttle by the driver. In the embodied form of valve actuating and controlling means, the stem 45 of valve 29 works in a gland 44 in the valve chamber, and at its outer end has a pin and slot connection with the upper end of the lever 46, which lever is pivotally mounted at 47 upon a bracket 48, mounted on the cylinder head. The opposite end of lever 46 is pivoted at 48 to a rod 49 projecting through the floor and having a head 50 convenient to the foot of the driver. A compression spring 51 about rod 50 tends to hold the valve mechanism in the clutch-engaging position except when the button 50 is depressed under the foot of the driver.

The embodied form of the means for automatically controlling the movement of the piston during the re-engagement of the clutch comprises a latch lever 58 pivotally connected at 59 to a bracket 60, mounted on the cylinder head. The latch lever has an aperture 61 having two detent notches 62 and 63, and a tension spring 64 yieldingly holds the latch lever in engaging position A pin 67 projects from the side of the lever 46 into the aperture 61 of the latch lever, and at two points in its travel is engaged successively by the detent notches 62 and 63. As embodied the movement and successive positionings of the valve is controlled by or timed with the movement and position of the piston 16, which governs the re-engaging movement of the clutch. In the embodied form of such control, a cam surface 69 is formed on the latch lever 58 near one end thereof and another cam surface 70 is formed on the latch lever near the other end thereof, and for the purpose of easy action a pivoted spring-pressed finger 71 is preferably employed. Formed on the head of piston rod 17 is a cam surface 73 adapted to engage with the cam surface 69 of the latch lever, and also on the piston rod head is a pin 74 adapted to engage with the cam surface 70 on the latch lever.

The manner of operation of the hereinbefore described mechanism is substantially as follows:—The automotive vehicle may be assumed to be in motion with the motor running and the clutch in engagement. Under those conditions the mechanism is in the position of Fig. 2 with atmospheric pressure on both sides of the piston 16 through ports 27, 32 and ports 30, 31. To throw out the clutch the driver steps on the button 50, moving the slide valve from the position of Fig. 2 to that of Fig. 3. In this position the annular groove 39 in the slide valve maintains communication through ports 32 and 27 between the right-hand end of the cylinder and the atmosphere. At the same time, the groove 40 in the slide valve establishes communication through port 30 and conduit 34 between the left-hand end of the cylinder and the motor intake 2, creating sub-atmospheric pressure in that end of the cylinder, and under the difference in pressure thus created the piston 16 moves from the right-hand end to the left-hand end of cylinder 14, as shown in Fig. 3, and the clutch 3 is disengaged against its spring and remains disengaged so long as the driver presses the button 50. To insure the piston 16 making the full clutch disengaging stroke just described, irrespective of possible quick release of the button 50, upon lever 46 reaching the position of Fig. 3, the pin 67 engages with the notch 62 and lever 46 is thereby held against the retractive effort of spring 51 until the piston has made its full stroke, when cam surface 73 on the piston rod engages cam surface 69 on the latch lever, which occurs at the completed stroke of piston 16. This moves the latch lever downwardly against its spring 64, as shown in Fig. 3, and thereby releases lever 46. When the detent notch 62 is thus moved down free of pin 67, and if the driver has released button 50, lever 46 is moved counter-clockwise by spring 51, and the slide valve begins moving toward the left from the position of Fig. 3 under the impulsion of spring 51. The first part of this left-hand movement of the slide valve from the position of Fig. 3 cuts off the right-hand end of the cylinder from the atmosphere and the left-hand end of the cylinder from the intake suction, and almost immediately establishes intercommunication between the two sides of the piston by the slide valve assuming the position shown in Fig. 4, midway of the counter-clockwise movement of lever 46, the various relative positions of the valve and ports whereby this is effected being later described. The pressure on both sides of the piston is rapidly equalized by the intercommunication, and the piston 16 moves to the right under the impulsion of the clutch spring. At the beginning of the movement of the piston 16 toward the right, cam surface 73 on the piston rod leaves cam surface 69 on latch lever 58, and the lever is drawn up by spring 64, and is thus in position so that detent notch 63 arrests lever 46 in the position of Fig. 4. As to the movements by which these changes in fluid pressure action are effected, it will be seen that while the valve mechanism has reached the position shown in Fig. 4, the piston 16 is not in the full line position of Fig. 4, but is farther toward the left-hand end of the cylinder and is moving toward the right, as indicated by the dotted line position. During this movement of piston 16 to the right (with the valve mechanism in the position of Fig. 4) the slide valve 29 has already cut off port 27 from port 32 thereby cutting off the right-hand end of the cylinder from the atmosphere, and the slide valve has also cut off port 30 from the suction conduit 34, and the D cavity 41 has opened communication between both sides of the piston. Consequently at the beginning of the return stroke of the piston there is atmospheric pressure on the right-hand side thereof, and on the other side thereof the maximum sub-atmospheric pressure created by the intake suction, which is very large. Inter-communication between both sides of the piston is almost immediately established, as shown in Fig. 4, and the resulting air flowage tends to rapidly equalize the pressure on both sides of the piston, which moves rapidly to the right under the impulsion of the clutch spring. As the piston 16 approaches the solid line position of Fig. 4 it gradually and quickly cuts down the area of the passage 37 until the passage is entirely closed. This causes a gradual but quick retardation or deceleration of the movement of the piston through a short distance, due to the re-establishment of relatively greater pressure on the right-hand side thereof, and this effects the desired gradual and gentle engagement of the clutch elements, giving a smooth engagement and avoiding grabbing. At this position of the piston and of the clutch, the pin 74 on the piston rod head engages the cam 70 on the latch lever 58, depresses it and releases pin 67 from detent notch 63, and under the impulsion of spring 51 the lever 46 swings counter-clockwise from the position of Fig. 4 to that of Fig. 2. This position of the slide valve re-establishes communication of both ends of the cylinder with the atmosphere, the right-hand end through ports 27 and 32 and the left-hand end through ports 30 and 31, and effects a final quick let-in of the clutch under the impulsion of the clutch spring. Means are provided whereby the clutch may be thrown out by the driver, as for instance when the motor is not running or in case of accidental failure of the power actuated mechanism. For this purpose a pin 76 on lever arm 21 is in the path of pedal lever 5, and on depression of the latter lever 21 moves with it.

The invention in its broader aspects is not limited to the specific mechanisms shown and described but departures may be made therefrom within the scope of the accompanying claims without departing from the principles of the invention and without sacrificing its chief advantages.

What I claim is:

1. In an automotive vehicle having an internal combustion motor and a clutch, a power operated clutch actuating means comprising a cylinder, a piston in the cylinder and connections therefrom to the clutch, a valve having a plurality of ports at one end of said cylinder, connection from one of said ports to the intake manifold of the motor to create sub-atmospheric pressure within the cylinder, and said connections including said valve means for connecting and cutting off said last named port from the motor, and for concurrently controlling all of said ports at one end of the cylinder and means controlled by the piston for moving the valve means to port closing position and for moving the valve means to port opening position in certain positions of the piston.

2. In an automotive vehicle having an internal combustion motor and a clutch, a power operated clutch actuating means comprising a cylinder, a piston in the cylinder and connections therefrom to the clutch, a valve having a plurality of ports at one end of said cylinder, connections from one of said ports to the intake manifold of the motor to create subatmospheric pressure within the cylinder, a port at the other end of the cylinder, and said connections including said valve means for controlling said ports and means controlled by the piston for moving the valve means to port closing position and for moving the valve means to port opening position in certain positions of the piston.

3. In an automotive vehicle having an internal combustion motor and a clutch, a power operated clutch actuating means comprising a cylinder, a piston in the cylinder and connections therefrom to positively move the clutch out of engagement and to control its engagement, a connection from one end of the cylinder to the intake manifold of the motor to create sub-atmospheric pressure within the cylinder, fluid pressure conducting means for connecting both sides of the piston, and said connections including valve means for controlling the fluid pressure flow, means for returning said valve to clutch engaging position, and means released by the piston in a certain position for holding the valve in position to close the conducting means between the cylinder ends.

4. In an automotive vehicle having an internal combustion motor and a clutch, a power operated clutch actuating means comprising a cylinder, a piston in the cylinder and connections therefrom to positively move the clutch out of engagement and to control its engagement, a connection from one end of the cylinder to the intake manifold of the motor to create sub-atmospheric pressure within the cylinder, a port at the other end of the cylinder communicating with the atmosphere, fluid pressure conducting means for connecting both sides of the piston, and said connections including valve means for controlling the fluid pressure flow, means for returning said valve to clutch engaging position, and means released by the piston in a certain position for holding the valve in position to close the conducting means between the cylinder ends.

5. In an automotive vehicle having an internal combustion motor and a clutch, a power operated clutch actuating means comprising a cylinder, a piston in the cylinder and connections therefrom to positively move the clutch out of engagement and to control its engagement, a port at one end of the cylinder and connections therefrom to the intake manifold of the motor to create subatmospheric pressure within the cylinder, ports at either end of the cylinder communicating with the atmosphere, fluid pressure conducting means for connecting both sides of the piston, and said connections including valve means for controlling the fluid pressure flow, a latch holding the valve against movement to open the cylinder to atmosphere and means for releasing said latch by movement of the piston.

6. In an automotive vehicle having an internal combustion motor and a clutch, a power operated clutch actuating means comprising a cylinder, a piston in the cylinder and connections therefrom to the clutch, a port at one end of the cylinder and connection therefrom to the intake manifold of the motor to create sub-atmospheric pressure within the cylinder, a port at the other end of said cylinder communicating with the atmosphere, and said connections including valve means for controlling the fluid pressure flow including a venting port intermediate the cylinder ends and a valve device for venting air from the higher pressure side to the lower pressure side of said piston and means for rendering said device inoperative until after the piston has passed a particular point in its movement.

7. In an automotive vehicle having an internal combustion motor and a clutch, a power operated clutch actuating means comprising a cylinder, a piston in the cylinder and connections therefrom for positively moving the clutch out of engagement and to control its engagement, ports at either end of said cylinder, connection from one of said ports to the intake manifold of the motor to create sub-atmospheric pressure within the cylinder, another of said ports communicating with the atmosphere, fluid pressure conducting means for connecting both sides of the piston, said connections including valve means movable into a plurality of positions to control the fluid pressure flow, and means governed by the position of the piston in the cylinder for controlling the movement and successive positions of said valve means.

8. In an automotive vehicle having an internal combination motor and a clutch, a power operated clutch actuating means comprising a cylinder, a piston in the cylinder and connections therefrom to the clutch, ports at either end of said cylinder, one of said ports communicating with the atmosphere, connection from another of said ports to the intake manifold of the motor to create sub-atmospheric pressure within the cylinder, and said connections including valve means moved under control of the piston and ports connecting the valve means with the cylinder for creating successively atmospheric pressure on both sides of the piston, sub-atmospheric pressure on one side and atmospheric pressure on the other side of the piston, inter-communication between both sides of the piston and then re-establishment of atmospheric pressure on both sides of the piston.

9. In an automotive vehicle having an internal combustion motor and a clutch, a power operated clutch actuating means comprising a cylinder, a piston in the cylinder and connections therefrom for positively moving the clutch into and out of engagement, ports at either end of said cylinder, one of said ports communicating with the atmosphere, connection from another of said ports to the intake manifold of the motor to create sub-atmospheric pressure within the cylinder, said connections including valve means and ports connecting the valve means with the cylinder for creating successively atmospheric pressure on both sides of the piston, sub-atmospheric pressure on one side and atmospheric pressure on the other side of the piston, inter-communication between both sides of the piston to promote equalization of pressure, and means governed by the position of the piston in the cylinder for controlling the movement and successive positions of said valve means.

HOBART N. DURHAM.